United States Patent
Maiorano et al.

(10) Patent No.: US 8,943,075 B1
(45) Date of Patent: Jan. 27, 2015

(54) SHARED TENANCY CLASSES IN A SERVICE MODEL ARCHITECTURE

(75) Inventors: Salvador Maiorano, Dublin, CA (US); Kashif Qayyum, Fremont, CA (US); Jon Ruggiero, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 1258 days.

(21) Appl. No.: 12/290,641

(22) Filed: Oct. 31, 2008

(51) Int. Cl.
*G06F 17/30* (2006.01)

(52) U.S. Cl.
USPC .......... 707/755; 707/784; 717/108; 717/116; 717/168

(58) Field of Classification Search
USPC ................. 707/755, 784; 717/108, 116, 168
See application file for complete search history.

(56) References Cited

U.S. PATENT DOCUMENTS

| | | | |
|---|---|---|---|
| 7,921,299 B1* | 4/2011 | Anantha et al. | 713/187 |
| 2005/0021977 A1* | 1/2005 | Oberst | 713/182 |
| 2006/0247944 A1* | 11/2006 | Calusinski et al. | 705/1 |
| 2008/0162660 A1* | 7/2008 | Becker | 709/213 |
| 2008/0201701 A1* | 8/2008 | Hofhansl et al. | 717/168 |
| 2009/0049288 A1* | 2/2009 | Weissman | 712/245 |
| 2009/0327311 A1* | 12/2009 | Becker | 707/10 |
| 2010/0205165 A1* | 8/2010 | Fell et al. | 707/705 |
| 2011/0004622 A1* | 1/2011 | Marson | 707/770 |

* cited by examiner

*Primary Examiner* — Shew-Fen Lin
(74) *Attorney, Agent, or Firm* — Van Pelt, Yi & James LLP

(57) ABSTRACT

An object class is disclosed. The object class comprises a mixed-tenanted object class. An instance of the mixed-tenanted object class is indicated as tenanted or is indicated as non-tenanted.

12 Claims, 10 Drawing Sheets

MT: Mixed-Tenanted
T: Tenanted
NT: Non-Tenanted

SHARED TENANCY CLASSES IN A SERVICE MODEL ARCHITECTURE

BACKGROUND OF THE INVENTION

Users of an enterprise business software system expect the system to provide for them a rich set of functionality. For example, a finance system might be expected to prepare paychecks, prepare tax returns, create end of the year reports, etc. A personnel system might be expected to prepare reports of personnel sorted or categorized in various ways, to process the hiring of employees, etc. The built-in functionality is maintained by the software provider and is expected to remain correct over time, for example as the tax codes or hiring laws change. Additionally, the software provider may discover flaws in released software that need to be corrected, and develop more advanced features to be added to the software. These factors all necessitate that the software provider periodically create updated versions of the enterprise business software.

In addition to the functionality built into the enterprise business software, users expect the software to be extensible and modifiable. Many typical business processes differ significantly in their details from company to company, and the enterprise software needs to be modified by the user to meet his company's needs. Users may also desire unusual functionality that is not built into the enterprise software system. A typical user of business software invests a great deal of time and money in customizing the software to correctly perform all of the tasks necessary to his company.

A software provider seeking to upgrade an enterprise business software package faces a significant challenge when a customer has extensively customized his installation of the software. If the new version of the software completely overwrites the previous installation, all of the customizations will be lost, and the customer will need to repeat all modifications to the software. Overwriting modified parts of the software can be avoided by only upgrading parts that have been left by the customer in their default state. However, this process is difficult to automate, so it becomes extremely time-consuming and expensive, and risks the possibility that a part of the software that is essential to upgrade will be skipped.

Some enterprise software systems are installed and maintained on computing hardware owned by the client. Other enterprise software systems use a service model architecture, also known as software as a service (SaaS). In enterprise software systems using a service model architecture, the software provider maintains both the software and hardware systems, which are used remotely by the customer. The software provider may design their service model architecture in such a way that a separate enterprise system is used for each customer on separate computers, or they may design it such that all customers share a single enterprise system. Using a single enterprise system increases the scalability of the service model architecture to large numbers of customers by reducing the total number of hardware and software systems that require regular maintenance. However, the complexity of the system increases when it gains the ability to handle multiple customers. The system must ensure that customers cannot access each other's data, even though data belonging to many different customers is stored in the same memory and accessed with the same system. It must further distinguish system-wide data, which is available to all customers.

The service model architecture enterprise software system designates customers as tenants of the shared enterprise system. Some data object classes in an object-based enterprise software system are designated as tenanted, or belonging to a specific tenant. Data instances of the tenanted object classes belong to the tenant that created them, and may only be accessed by the tenant they belong to. Some data object classes are marked as non-tenanted, or not belonging to any tenant. Data instances of non-tenanted objects are accessible by any tenant of the enterprise system, and are not modifiable by tenants.

BRIEF DESCRIPTION OF THE DRAWINGS

Various embodiments of the invention are disclosed in the following detailed description and the accompanying drawings.

DETAILED DESCRIPTION

Figure 1:
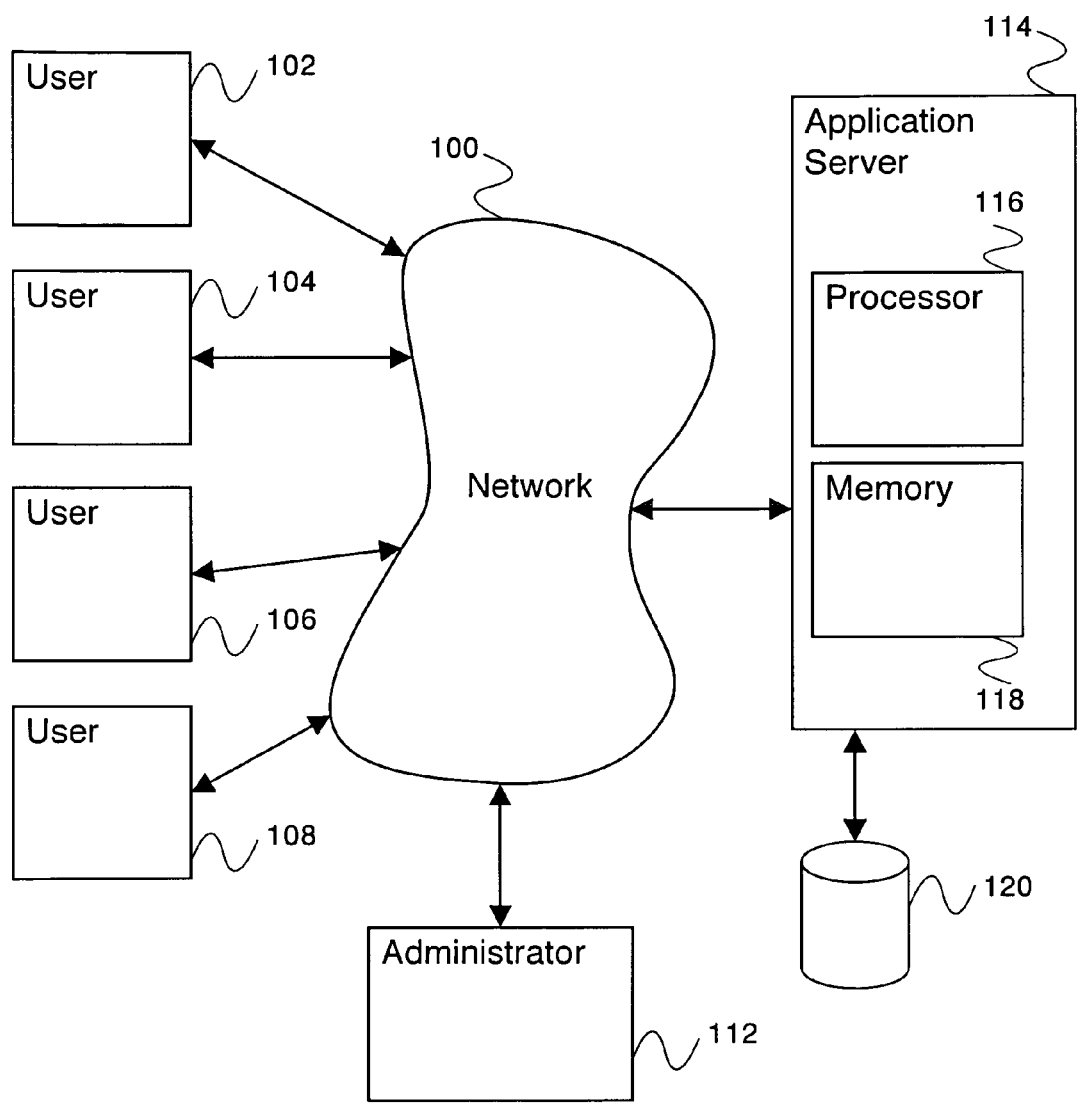
FIG. 1 is a block diagram illustrating an embodiment of an enterprise system with a service model architecture.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Shared tenancy classes in a service model architecture is disclosed. Some data object classes are designated as mixed-tenanted. Instances of mixed-tenanted data object classes can be created by a tenant (e.g., a user associated with the tenant) and marked as belonging to their creator, or they can be created by the vendor of the enterprise system, and marked as non-tenanted. Tenanted object instances can only be accessed and modified by their owner (e.g., a user associated with the tenant that created the instance); non-tenanted object instances can be accessed but not modified by any tenant. When the enterprise system interacts with an instance of a mixed-tenanted object class, it first determines whether the instance is designated as tenanted or non-tenanted and then deals with it appropriately.

In an enterprise system using shared tenancy, built-in functionality of the enterprise system is created in mixed-tenanted object classes. A non-tenanted instance of the object is created by the vendor of the enterprise system, accessible by all users of the enterprise system. If the default behavior of the enterprise system is satisfactory to the system user, he can use the non-tenanted object instance as it is. If the user desires customizations to the object, he can create a tenanted instance of the object, accessible only to him, and make the desired customizations. In this way, a clear separation is achieved between the objects that are owned by the system and those that are owned by the tenants. When the software provider desires to upgrade the software, it is safe for the system to replace non-tenanted objects and non-tenanted instances of mixed-tenanted objects, as they belong to the system and do not contain modifications by tenants. Tenanted object instances store user customizations, and are left alone during a system upgrade.

FIG. 1 is a block diagram illustrating an embodiment of an enterprise system with a service model architecture. In the example shown, application server 114 includes processor 116 and memory 118. Application server 114 is coupled to external storage 120 so that application server 114 is able to store information to and access information from external storage 120. Application server 114 is also coupled to network 100. In various embodiments, network 100 comprises one or more of the following: a local area network, a wide area network, a wired network, a wireless network, the Internet, or any other appropriate network. Network 100 enables users 102, 104, 106, and 108 to access application server 114. In various embodiments, users 102, 104, 106, and 108 may be part of the same organization or different organizations, and may be at the same location or at physically remote locations. In some embodiments, data stored in external storage 120 is partitioned into one or more sections corresponding to different organizations (e.g., associated with different tenants), and application server 114 ensures that users may only access data for their organization. In some embodiments, data stored in external storage 120 includes a section not associated with any organization, and application server 114 allows any user to access that section. In various embodiments, stored data is related to a business requirement such as an expense report, a personnel file, data related to an employee, a record (e.g., human resource, corporate, financial, legal, medical, or other records), or any other relevant data. In various embodiments, the application server comprises a human resource system, payroll system, financial system, supply chain management system, customer relation management system, content management system, business system, or any other appropriate enterprise system.

In some embodiments, administrator 112 manages the enterprise system. In various embodiments, administrator 112 can add or remove database users from the enterprise system, configure the setup of network 100 or application server 114, update the software running on application server 114, or perform any other appropriate administrative action. In some embodiments, software running on application server 114 is designed in such a way that it can be configured by a user (e.g. user 102, 104, 106, or 108). In some embodiments, software running on application server 114 is designed in such a way that it can be updated by administrator 112 without disturbing configurations made by a user.

Figure 2:
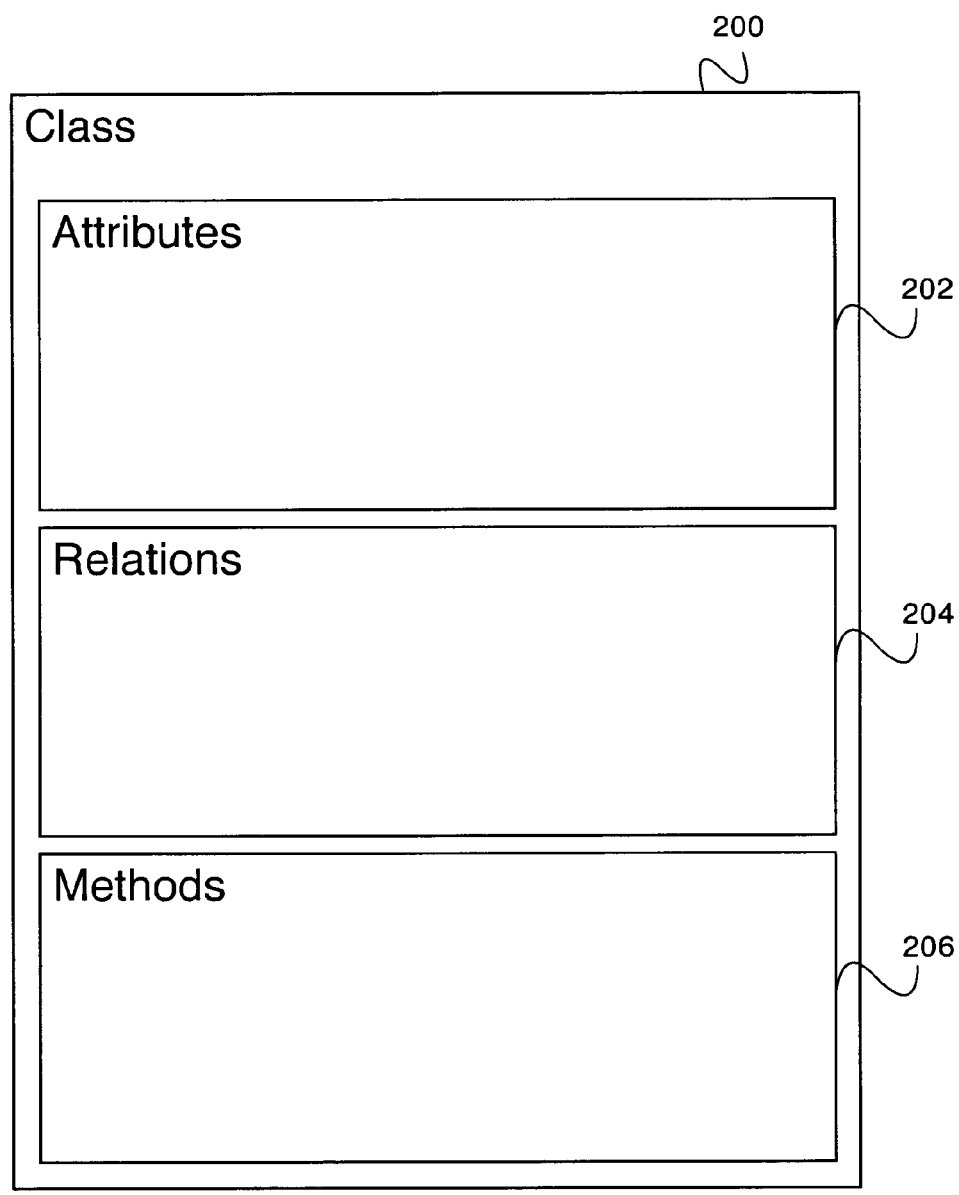
FIG. 2 is a block diagram illustrating an embodiment of a class data structure.

FIG. 2 is a block diagram illustrating an embodiment of a class data structure. In some embodiments, stored data (e.g., data stored in external storage 120 of FIG. 1) is stored in class data structures of FIG. 2. In the example shown, class 200 is comprised of zero, one, or more than one attributes 202, zero, one, or more than one relations 204, and zero, one, or more than one methods 206. Attributes 202 store data about the class, for instance, name, location, salary, title, or any other human resource, corporate, financial, legal, or medical data, or any other appropriate data. Relations 204 store relations between a given object instance of class 200 and other object instances of the class or of other class definitions. Methods 206 define operations that can be performed with the attributes and relations. A given class definition has a certain set of attributes and relations, as well as a certain set of methods used to operate on those attributes and relations. A given object instance of a class definition has defined values for each of the attributes and relations.

In some embodiments, object classes are designated as either tenanted or non-tenanted, where instances of tenanted objects are associated with a specific tenant (user 102, 104, 106, or 108 is uniquely linked to a tenant), and instances of non-tenanted objects are not associated with a specific tenant. In some embodiments, an object class can be designated as mixed-tenanted, wherein an instance of a mixed-tenanted object class is indicated as tenanted or is indicated as non-tenanted. An instance of a tenanted object class is associated with a specific tenant, and an instance of a non-tenanted object class is not associated with a specific tenant.

In some embodiments, object classes can inherit from one another. When a child object class inherits from a parent object class, it takes on the class definition of the parent object. The class definition of the child object can then be extended by adding or overwriting methods, attributes, or relations.

Figure 3:
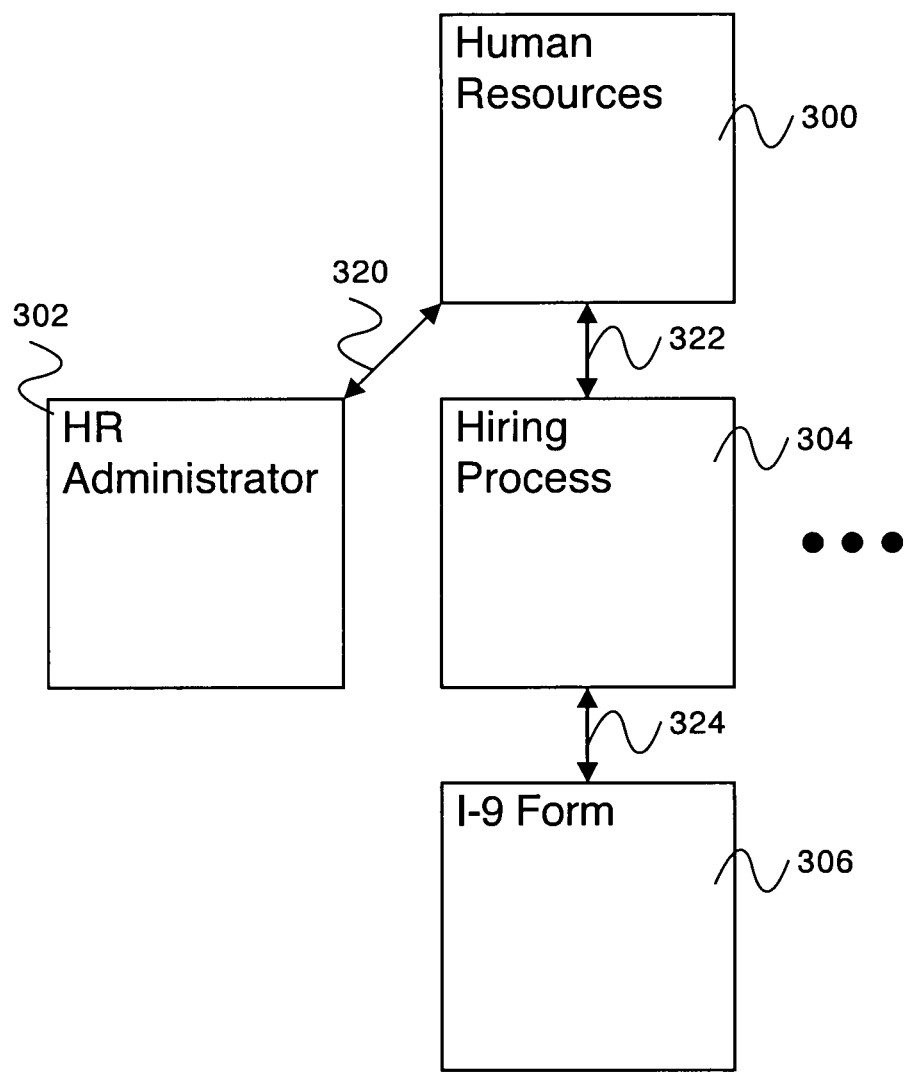
FIG. 3 is a block diagram illustrating an embodiment of a data structure for an object tree.

FIG. 3 is a block diagram illustrating an embodiment of a data structure for an object tree. In some embodiments, objects 300, 302, 304, and 306 comprise object data structures as shown in FIG. 2. In some embodiments, relations 320, 322, and 324 comprise relations referred to in FIG. 2. In the example shown, objects represented in FIG. 3 represent a part of a human resources group of a business organization. Human resources group object 300 has relation 320 to HR administrator object 302. HR administrator object 302 represents the HR administrator for the human resources group and contains methods, attributes and relations describing the HR administrator. Human resources group object 300 also has relation 322 to hiring process object 304. Hiring process object 304 contains methods, attributes, and relations used in the process of hiring a new employee. In some embodiments, human resources group object 300 has relations to one or more other objects representing business entities, employees, business processes, or any other appropriate objects. In the example shown, hiring process object 304 has relation 324 to I-9 form object 306. I-9 form object 306 contains methods, attributes, and relations representing the United States Federal I-9 form. In some embodiments, I-9 form object 306 is accessed by hiring process object 304 as part of the process of hiring a new employee.

In some embodiments, HR administrator object 302 is a tenanted object. Only users associated with the same tenant that the HR administrator is associated with are allowed to access HR administrator object 302. In some embodiments, hiring process object 304 is a mixed-tenanted object. All users of the enterprise system, regardless of their tenant, may need access to a hiring process, so non-tenanted hiring process object instances are included in the enterprise system by default. All users are able to access, but not modify, the non-tenanted hiring process objects. If a user has requirements for a hiring process beyond what is included in the default non-tenanted object, the user can create a tenanted instance of the hiring process. The tenanted instance of the hiring process object is accessible and modifiable by users of the tenant in which it was created, but not accessible or modifiable by any users associated with other tenants. In other aspects, the tenanted instance of the hiring process object acts the same as the non-tenanted instances of the hiring process object. In some embodiments, when the developers of the enterprise system release an improved version of the enterprise system, the improved version includes a new default hiring process. The default hiring process can be modified without overwriting user customizations by replacing non-tenanted object instances of the hiring process object but not replacing tenanted instances of the hiring process object. Users using the default version receive the improvements in the improved version of the enterprise system, and users using a custom version do not lose their customizations.

In some embodiments, I-9 form object 306 is a non-tenanted object. Users need the default official version of the form, and should not be allowed to modify it. If the form receives an official update, a new version of the non-tenanted object will be included in an improved version of the database software and made available to all users.

Figure 4:
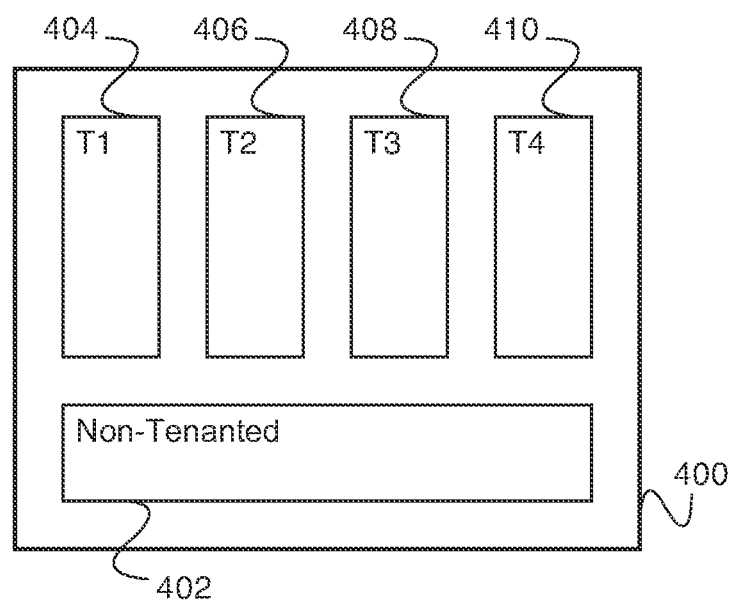
FIG. 4 is a block diagram illustrating an embodiment of data stored in an enterprise system.

FIG. 4 is a block diagram illustrating an embodiment of data stored in an enterprise system. In some embodiments, data 400 is stored in an external storage (e.g. external storage 120 of FIG. 1) as part of an enterprise system with a service model architecture. In some embodiments, data 400 is comprised of object class data structures (e.g. object class 200 of FIG. 2). In the example shown, data 400 is partitioned in data sections 402, 404, 406, 408, and 410. Data sections 404, 406, 408, and 410 each contain tenanted data, and are each associated with a specific tenant and is only allowed to be accessed or modified by users of this tenant (e.g. user 102, 104, 106, or 108 of FIG. 1). In some embodiments, users are not allowed to access tenanted data associated with a different tenant. In the example shown, data segment 402 contains non-tenanted data, not associated with any user. In various embodiments, system data, system metadata, default data, generic data, or any other appropriate non-tenanted data is stored in data segment 402. In some embodiments, object classes are designated as either tenanted or non-tenanted, where all instances of tenanted objects are stored in a tenanted data segment, and all instances of non-tenanted objects are stored in the non-tenanted data segment. In some embodiments, object classes can be designated as mixed-tenanted, where instances of mixed-tenanted object classes are designated either as tenanted, and stored in a tenanted data segment, or as non-tenanted, and stored in the non-tenanted data segment.

Figure 5A:
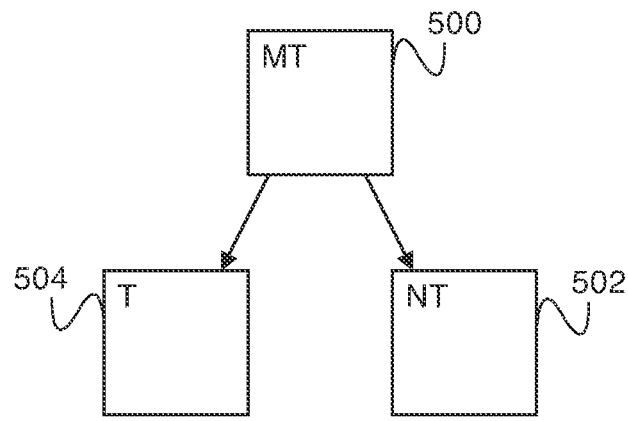
FIG. 5A is a block diagram illustrating an embodiment of a mixed-tenanted object class.

FIG. 5A is a block diagram illustrating an embodiment of a mixed-tenanted object class. In the example shown, object class 500 contains attributes, relations, and methods, as shown in FIG. 2. Object class 500 is designated as a mixed-tenanted object class. In some embodiments, object class 500 is defined as an abstract class, indicating that no instances of it are allowed to be created. Instances of object class 500 can be created only by creating instances of object classes that inherit from object class 500. In the example shown, child object classes 502 and 504 both inherit the class definition of object class 500. Object class 502 is designated as a non-tenanted object class and keeps the class definition of object class 500. Object class 504 is designated as a tenanted object class and keeps the class definition of object class 500. Instances of object class 500 that are indicated as tenanted can be created by creating instances of object class 504. Instances of object class 500 that are indicated as non-tenanted can be created by creating instances of object class 502

In some embodiments, an instance of the mixed-tenanted object class that is indicated as tenanted was created by a tenant. In some embodiments, the tenanted instance of the mixed-tenanted object class is used for customization. In some embodiments, the instance of the mixed-tenanted object class that is indicated as tenanted is able to be accessed only by the tenant (e.g., a user associated with a tenant). In some embodiments, the instance of the mixed-tenanted object class that is indicated as tenanted is modified only by the tenant. In some embodiments, the instance of the mixed-tenanted object class that is indicated as tenanted is not updated during a system upgrade (e.g., not updated, or preserved, in the event of a software revision upgrade or version update, etc.). In some embodiments, the instance of the mixed-tenanted object class that is indicated as non-tenanted is accessed by any tenant. In some embodiments, the instance of the mixed-tenanted object class that is indicated as non-tenanted is not modifiable by any tenant. In some embodiments, the instance of the mixed-tenanted object class that is indicated as non-tenanted is updated during a system upgrade (e.g., updated, or not preserved, in the event of a software revision upgrade or version update, etc.).

Figure 5B:
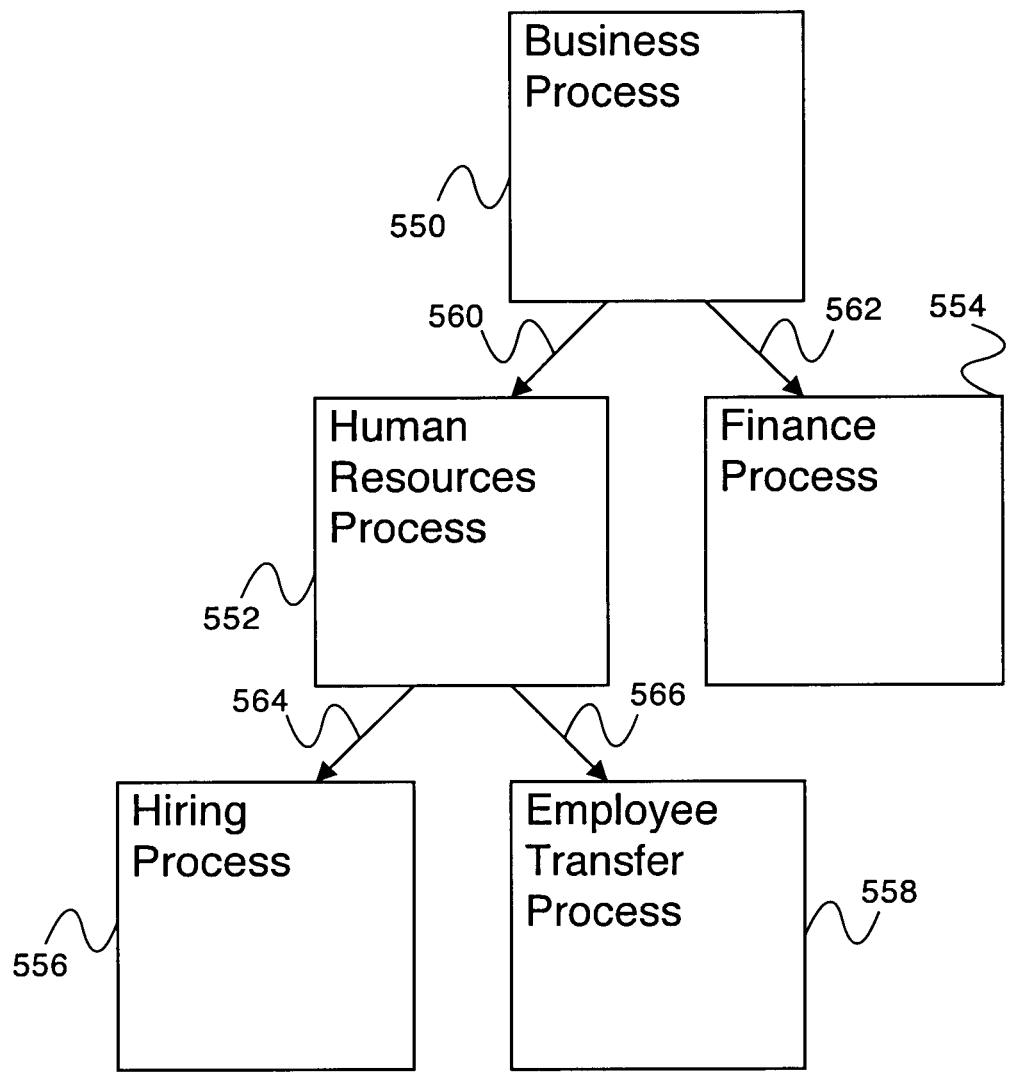
FIG. 5B is a block diagram illustrating an embodiment of an object inheritance structure.

FIG. 5B is a block diagram illustrating an embodiment of an object inheritance structure. In some embodiments, object classes 550, 552, 554, 556, and 558 comprise class data structures as shown in FIG. 2. In some embodiments, relations 560, 562, 564, and 566 comprise class inheritance relations. In some embodiments, in an inheritance relationship, a child class inherits methods, attributes, and relations from its parent class and may include additional methods, attributes, and relations beyond that of its parent. In the example shown, business process class 550 has methods used in business processes. Business processes can be created as object instances of business process class 550. Human resources process class 552 and finance process class 554 inherit from business process class 550. Human resources process class 552 comprises the methods of business process class 550 and methods used in human resources processes. Finance process class 554 comprises the methods of business process class 550 and methods used in finance processes. Hiring process class 556 and employee transfer process class 558 inherit from human resource process class 552. Hiring process class 556 comprises the methods of human resources process class 552 and methods used in the process of hiring an employee. Employee transfer process class 558 comprises the methods of human resources process class 552 and methods used in the process of transferring an employee.

In some embodiments, instances of one or more of classes 550, 552, 554, 556, and 558 are non-tenanted and included with the enterprise software as a default. In some embodiments, tenanted instances of one or more of classes 550, 552, 554, 556, and 558 can be created and modified by a user of a tenant. In some embodiments, it is desirable to create both tenanted and non-tenanted instances of one or more of classes 550, 552, 554, 556, and 558. Creating both tenanted and non-tenanted instances of a class can be accomplished by creating two separate class definitions with identical methods, attributes, and relations, one tenanted and one non-tenanted. Tenanted instances of the class are then created as instances of the tenanted class definition, and non-tenanted instances are created as instances of the non-tenanted class definition. Enabling creation of tenanted and non-tenanted instances in this way becomes problematic when building relations between classes. If a first class is implemented as a pair of classes, one tenanted and one non-tenanted, any second class that has a relation with the first class must have a pair of relations, one with each of the pair of classes. Conversely, each of the pair of classes implementing the first class must have relations with the second class. This results in a greatly increased number of relations necessary and greatly increases the complexity of the network of classes over what is shown in FIG. 5B. Each of the pair of classes must be maintained separately, but kept identical, increasing the possibility of introducing errors into the system design.

Creating both tenanted and non-tenanted instances of a class can be accomplished using the method shown in FIG. 5A. Each class that requires tenanted and non-tenanted instances is implemented as a mixed-tenanted parent class with tenanted and non-tenanted child classes inheriting from the parent class. Tenanted instances of the class are then created as instances of the tenanted child class, and non-tenanted instances of the class are created as instances of the non-tenanted child class. During design of the class and of the class inheritance network, modifications are applied to the mixed-tenanted parent class, and are automatically inherited by the tenanted and non-tenanted child classes. The topology of the class inheritance network is left unchanged from the diagram shown in FIG. 5B.

Figure 6:
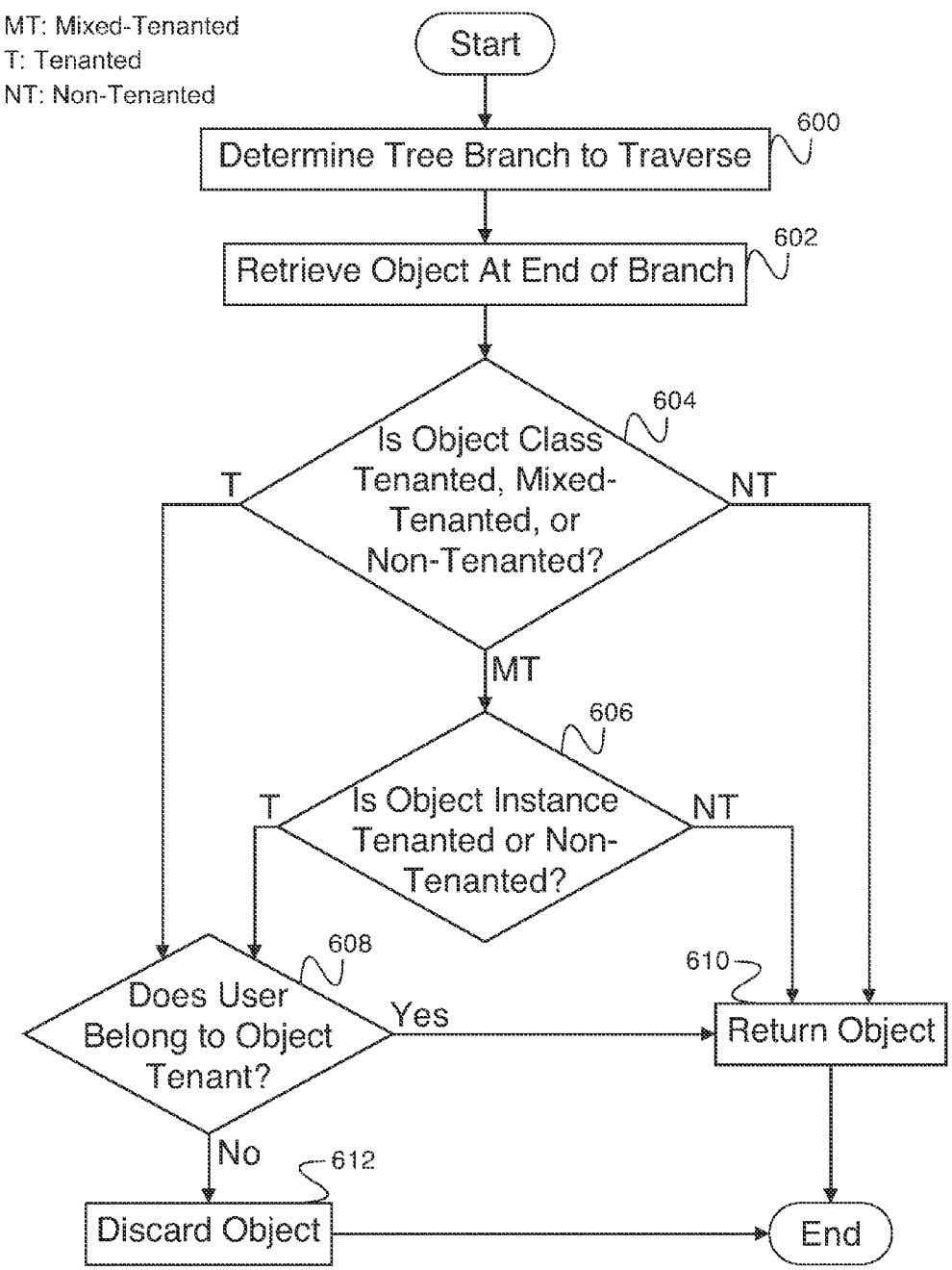
FIG. 6 is a flow diagram illustrating an embodiment of a process for traversing a tree.

FIG. 6 is a flow diagram illustrating an embodiment of a process for traversing a tree. In some embodiments, the process of FIG. 6 is used to traverse a tree such as the tree of FIG. 3. In the example shown, in 600, the tree branch to traverse is determined. In various embodiments, the tree branch to traverse is determined by an object method, by the system administrator, by the database user, from a predetermined list of branches to traverse, or by any other appropriate method. In 602, the object at the end of the branch is retrieved. In some embodiments, the object at the end of the branch is retrieved using a reference stored in starting object. In 604, it is determined whether the object class of the retrieved object is tenanted, mixed-tenanted, or non-tenanted. If the retrieved object is tenanted, control passes to 608. If the retrieved object is non-tenanted, control passes to 610. In the event that the retrieved object is mixed-tenanted, control passes to 606. In 606, it is determined whether the instance of the retrieved mixed-tenanted object class is tenanted or non-tenanted. If the object instance is tenanted, the object instance is processed as a tenanted object, and control passes to 608. If the object is non-tenanted, the object instance is processed as a non-tenanted object, and control passes to 610.

In 608, it has been established that the retrieved object is either an instance of a tenanted object class or a tenanted instance of a mixed-tenanted object class, so the instance is processed as a tenanted object. In some embodiments, processing an instance as a tenanted object comprises allowing access to the tenanted object only for a tenant. In some embodiments, processing an instance as a tenanted object comprises allowing only a tenant associated with the tenanted object to modify the tenanted object. In some embodiments, processing an instance as a tenanted object comprises not allowing the tenanted object to be updated during a system upgrade. In the example shown, it is then determined whether the user executing the tree traversal process is a member of the object tenant. If the user is a member of the same tenant that the object is associated with, control passes to 610. If the user is a member of a different tenant than the one the object is associated with, control passes to 612. In 612, the retrieved object is discarded, and the process ends.

In some embodiments, in 610, it has been established that the retrieved object is either an instance of a non-tenanted object class, or a non-tenanted instance of a mixed-tenanted object class, and the object instance is processed as a non-tenanted object. In some embodiments, processing an instance as a non-tenanted object comprises allowing access to the non-tenanted object for any tenant. In some embodiments, processing an instance as a non-tenanted object comprises not allowing any tenant to modify the non-tenanted object. In some embodiments, processing an instance as a non-tenanted object comprises allowing updating to the non-tenanted object during a system upgrade. In some embodiments, in 610, it has been established that the retrieved object is a tenanted object instance (either an instance of a tenanted object class, or a tenanted instance of a mixed-tenanted object class) and that the system user is a member of the same tenant that the object is associated with. In the example shown, in 610, the retrieved object is then returned to the database user, and the process ends.

Figure 7A:
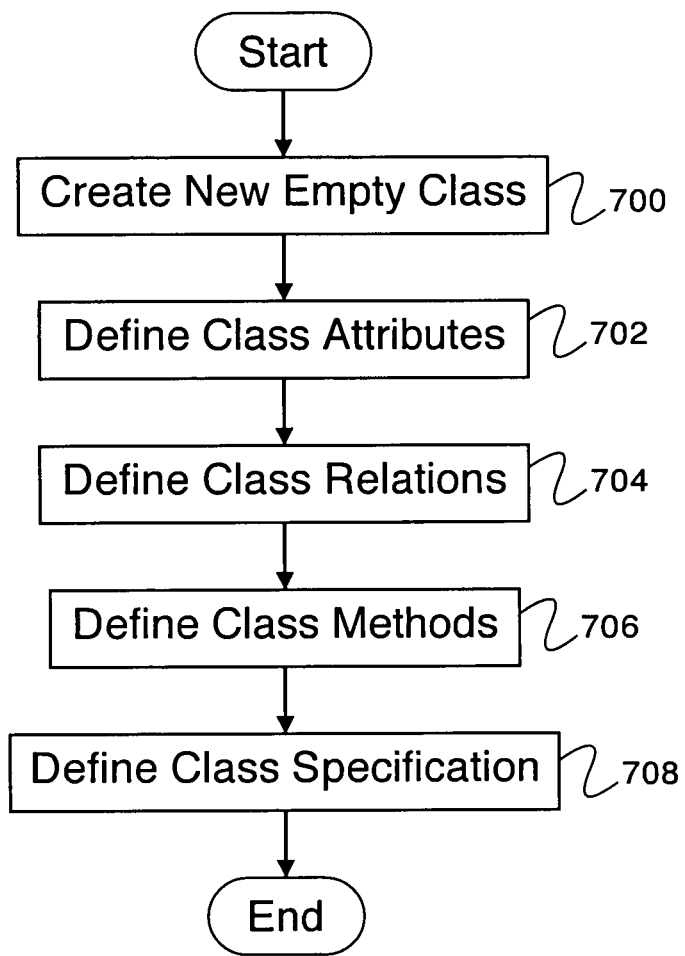
FIG. 7A is a flow diagram illustrating an embodiment of a process for creating a class.

FIG. 7A is a flow diagram illustrating an embodiment of a process for creating a class. In some embodiments, the process of FIG. 7 creates class 200 of FIG. 2. In the example shown, in 700, a new empty class is created. In 702, class attributes (e.g. attributes 202 of FIG. 2) are defined. In 704, class relations (e.g. relations 204 of FIG. 2) are defined. In 706, class methods (e.g. methods 206 of FIG. 2) are defined. In 708, the class specification is defined. The class specification describes the tenancy mode of the class. The process then ends. In some embodiments, the order of the steps is different—for example, a class is created, a class specification is defined, attributes are defined, relationships are defined, and methods are defined.

Figure 7B:
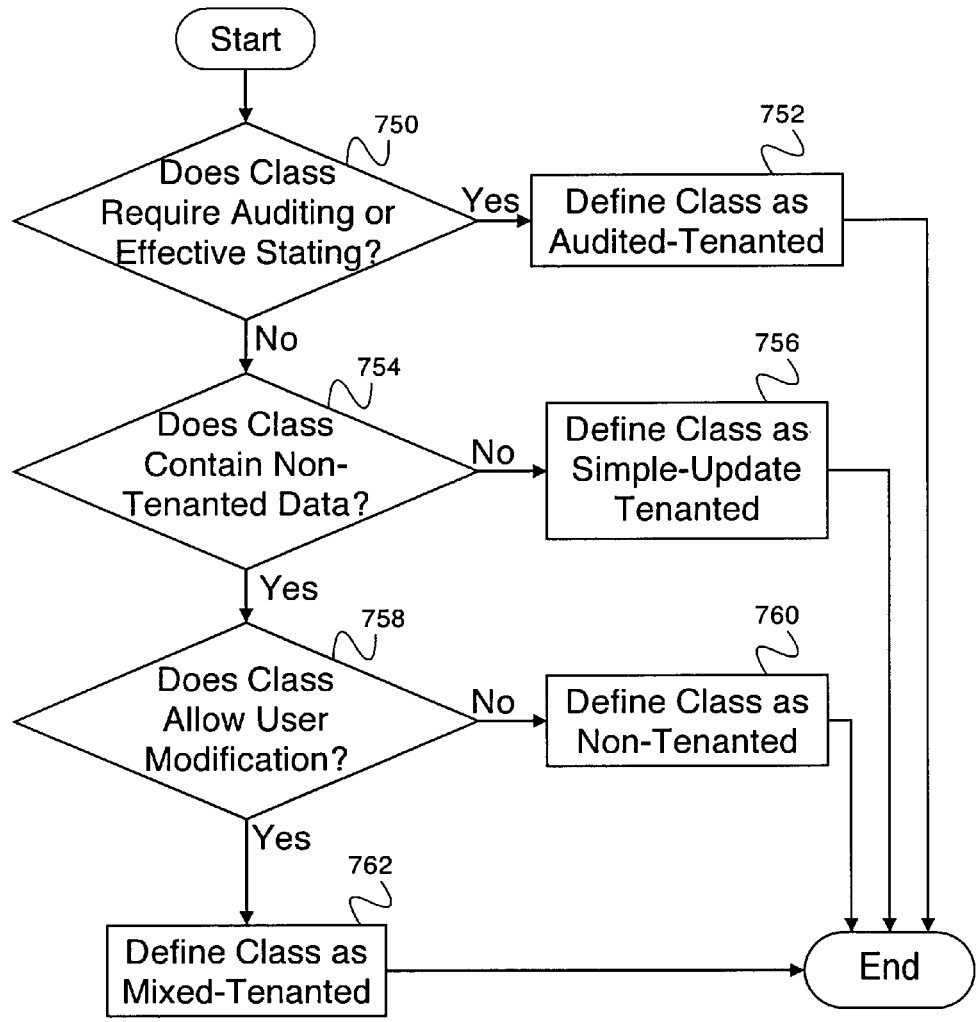
FIG. 7B is a flow diagram illustrating an embodiment of a process for defining a class specification.

FIG. 7B is a flow diagram illustrating an embodiment of a process for defining a class specification. In some embodiments, the process of FIG. 7B implements 708 of FIG. 7A. In the example shown, in 750, it is determined whether the class requires auditing or effective stating. In some embodiments, effective stating allows an object instance of the class to record its state as it changes with time and to recall its state at any arbitrary time. In some embodiments, auditing allows an object instance of the class to be updated in a non-destructive way. If it is determined that the class requires auditing or effective stating, control passes to 752. If it is determined that the class does not require auditing or effective stating, control passes to 754. In 752, the class is defined as audited-tenanted, and the process ends.

In 754, the process determines whether the class contains non-tenanted data. In various embodiments, non-tenanted data comprises system data, system metadata, default data, generic data, or any other appropriate non-tenanted data. If it is determined that the class does not contain non-tenanted data, control passes to 756. If it is determined that the class contains non-tenanted data, control passes to 758. In 756, the class is defined as simple-update tenanted, and the process ends. In some embodiments, a simple-update-tenanted class contains only tenanted data but does not require auditing or effective stating.

In 758, the process determines whether the class allows user modification. In some embodiments, classes containing non-tenanted data can allow user modification. When non-tenanted data is modified by a user, a tenanted object instance of the class is created to store the user modifications and keep them separate from the non-tenanted data. In some embodiments, user modifications to a class containing non-tenanted data are stored in the same way as data stored in a simple-update tenanted class. If it is determined that the class allows user modification, control passes to 762. If it is determined that the class does not allow user modification, control passes to 760. In 762, the class is defined as mixed-tenanted, and the process ends. In 760, the class is defined as non-tenanted, and the process ends.

Figure 8:
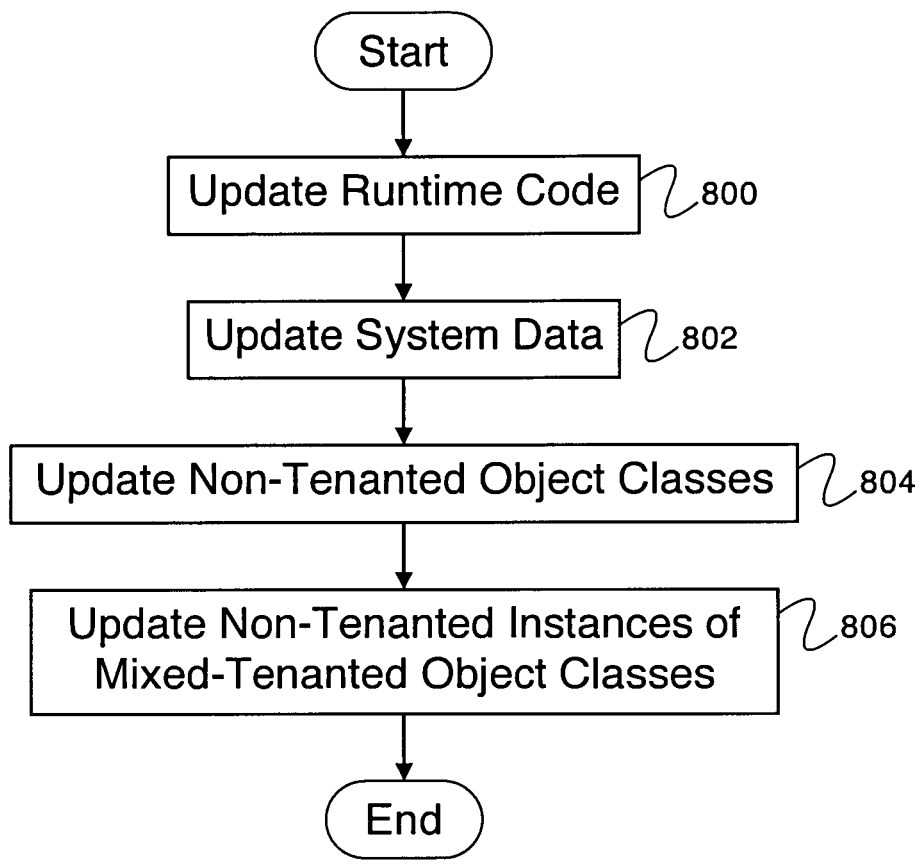
FIG. 8 is a flow diagram illustrating an embodiment of a process for updating software with shared tenancy classes.

FIG. 8 is a flow diagram illustrating an embodiment of a process for updating software with shared tenancy classes. In some embodiments, the process of FIG. 8 is used by administrator 112 of FIG. 1 to update software running on application server 114 of FIG. 1. In the example shown, in 800, the software runtime code is updated. In 802, the system data is updated. In some embodiments, system data comprises non-tenanted data and, in this case, a separate updating of system data may not be appropriate and/or required. In 804, the non-tenanted object classes are updated. In 806, non-tenanted instances of the mixed-tenanted object classes are updated, and the process ends. In some embodiments, if there are tenanted instances of mixed-tenanted object classes, they are not updated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for object class storage, comprising:
A processor configured to:
store a mixed-tenanted object class;
store a tenanted child class that inherits from the mixed-tenanted object class;
store a non-tenanted child class that inherits from the mixed-tenanted object class;
store an instance of the mixed-tenanted object class, wherein the instance is indicated as tenanted or non-tenanted, wherein the instance that is indicated as tenanted comprises an instance of the tenanted child class inheriting from the mixed-tenanted object class or wherein the instance that is indicated as non-tenanted comprises an instance of the non-tenanted child class inheriting from the mixed-tenanted object class, wherein the instance of the tenanted child class is accessible and modifiable only by a user associated with the tenant, and wherein the instance of the non-tenanted child class is accessible but not modifiable by any tenant;
retrieve an object instance at an end of a branch of an object tree;
determine whether the object instance has a class that is mixed-tenanted;
in the event that the object instance has a class that is mixed-tenanted, determine whether the object instance is of the tenanted child class;
in the event that the object instance is of the tenanted child class, determine whether the user retrieving the object instance is a member of the tenant to which the tenanted child class belongs to;
in the event that the user is the member of the tenant, return the object instance; and
in the event that the user retrieving the object instance is not a member of the tenant to which the tenanted child class belongs to, discard the retrieved object instance;
A memory coupled to the processor, wherein the memory is configured to provide the processor with instructions.

2. The system of claim 1, wherein the instance of the mixed-tenanted object class that is indicated as tenanted was created by a tenant.

3. The system of claim 1, wherein the tenanted child class is used for customization.

4. The system of claim 1, wherein the instance of the mixed-tenanted object class that is indicated as tenanted is not updated during a system upgrade.

5. The system as in claim 1, wherein the processor is further configured to in the event that the object instance is of the non-tenanted child class, return the object instance.

6. The system as in claim 3, wherein tenanted child class is customized by the user by adding or overwriting one or more of the following: methods, attributes or relations.

7. The system of claim 1, wherein the instance of the mixed-tenanted object class that is indicated as non-tenanted is updated during a system upgrade.

8. A method for processing an instance of an object, comprising:
storing, using a processor, a mixed-tenanted object class;
storing a tenanted child class that inherits from the mixed-tenanted object class;
storing a non-tenanted child class that inherits from the mixed-tenanted object class;
storing an instance of the mixed-tenanted object class, wherein the instance of the mixed tenanted object class is indicated as tenanted or non-tenanted, wherein the instance that is indicated as tenanted comprises an instance of the tenanted child class inheriting from the mixed-tenanted object class or wherein the instance that is indicated as non-tenanted comprises an instance of the non-tenanted child class inheriting from the mixed-tenanted object class, wherein the instance of the tenanted child class is accessible and modifiable only by a user associated with the tenant, and wherein the instance of the non-tenanted child class is accessible but not modifiable by any tenant;
retrieving an object instance at an end of a branch of an object tree;
determining whether the object instance has a class that is mixed-tenanted;
in the event that the object instance has a class that is mixed-tenanted, determining whether the object instance is of the tenanted child class;
in the event that the object instance is of the tenanted child class, determining whether the user retrieving the object instance is a member of the tenant to which the tenanted child class belongs to;
in the event that the user is the member of the tenant, returning the object instance; and
in the event that the user retrieving the object instance is not a member of the tenant to which the tenanted child class belongs to, discarding the retrieved object instance.

9. The method as in claim 8, wherein the instance of the mixed-tenanted object class that is indicated to be tenanted is not to be updated during a system upgrade.

10. The method as in claim 8, further comprising in the event that the object instance is of the non-tenanted child class, return the object instance.

11. The method as in claim 8, wherein the instance of the mixed-tenanted object class that is indicated as non-tenanted is updated during a system upgrade.

12. A computer program product for processing an instance of an object, the computer program product being embodied in a non-transitory computer readable medium and comprising computer instructions for:
- storing, using a processor, a mixed-tenanted object class;
- storing a tenanted child class that inherits from the mixed-tenanted object class;
- storing a non-tenanted child class that inherits from the mixed-tenanted object class;
- storing an instance of the mixed-tenanted object class, wherein the instance of the mixed tenanted object class is indicated as tenanted or non-tenanted, wherein the instance that is indicated as tenanted comprises an instance of the tenanted child class inheriting from the mixed-tenanted object class or wherein the instance that is indicated as non-tenanted comprises an instance of the non-tenanted child class inheriting from the mixed-tenanted object class, wherein the instance of the tenanted child class is accessible and modifiable only by a user associated with the tenant, and wherein the instance of the non-tenanted child class is accessible but not modifiable by any tenant;
- retrieving an object instance at an end of a branch of an object tree;
- determining whether the object instance has a class that is mixed-tenanted;
- in the event that the object instance has a class that is mixed-tenanted, determining whether the object instance is of the tenanted child class;
- in the event that the object instance is of the tenanted child class, determining whether the user retrieving the object instance is a member of the tenant to which the tenanted child class belongs to;
- in the event that the user is the member of the tenant, returning the object instance; and
- in the event that the user retrieving the object instance is not a member of the tenant to which the tenanted child class belongs to, discarding the retrieved object instance.

* * * * *